(12) United States Patent
Liang

(10) Patent No.: US 8,177,481 B2
(45) Date of Patent: May 15, 2012

(54) VERTICAL AXIS WIND TURBINE

(76) Inventor: Ray-Hung Liang, Morris Plains, NJ (US)

( * ) Notice: Subject to any disclaimer, the term of this patent is extended or adjusted under 35 U.S.C. 154(b) by 1282 days.

(21) Appl. No.: 11/900,270

(22) Filed: Sep. 10, 2007

(65) Prior Publication Data
US 2009/0066088 A1    Mar. 12, 2009

(51) Int. Cl.
F03D 3/00    (2006.01)

(52) U.S. Cl. .......... 415/4.2; 415/4.4; 415/907; 416/117; 416/132 B

(58) Field of Classification Search ............... 290/44, 290/55; 415/4.1, 4.2, 4.4, 905, 907; 416/117, 416/119, 132 B
See application file for complete search history.

(56) References Cited

U.S. PATENT DOCUMENTS

| | | | | |
|---|---|---|---|---|
| 188,020 | A * | 3/1877 | Manley | 416/188 |
| 209,853 | A * | 11/1878 | Benson | 416/15 |
| 802,791 | A * | 10/1905 | Abbey | 416/118 |
| 925,063 | A * | 6/1909 | White | 416/117 |
| 1,364,681 | A * | 1/1921 | Barto | 416/117 |
| 3,228,475 | A * | 1/1966 | Worthmann | 416/188 |
| 3,920,354 | A * | 11/1975 | Decker | 416/117 |
| 4,017,205 | A * | 4/1977 | Bolie | 415/208.2 |
| 4,248,568 | A | 2/1981 | Lechner | |
| 4,818,180 | A * | 4/1989 | Liu | 416/117 |
| 5,193,978 | A | 3/1993 | Gutierrez | |
| 7,040,858 | B2 | 5/2006 | Suzuki | |
| 2003/0059306 | A1 | 3/2003 | Miller | |
| 2004/0057829 | A1* | 3/2004 | Khan | 416/17 |
| 2005/0099013 | A1 | 5/2005 | Noguchi | |
| 2005/0230980 | A1* | 10/2005 | Brunet | 290/44 |
| 2007/0104582 | A1 | 5/2007 | Rahai et al. | |

* cited by examiner

Primary Examiner — Edward Look
Assistant Examiner — Ryan Ellis

(57) ABSTRACT

One aspect of the present invention relates to a vertical axis wind turbine. In one embodiment, the vertical axis wind turbine comprises a rotor comprising a vertical oriented shaft, and a plurality of vertical oriented blades angle-equally and radially secured to the vertical aligned shaft. Each of the plurality of vertical oriented blades has a face side, a back side, at least one window and at least one pane pivotally mounted onto the at least one window on the face side such that the at least one pane is rotatable between a closed position and an opening position around a pivotal axis responsive to a wind condition thereof. The pivotal axis is substantially perpendicular to the vertical oriented shaft.

7 Claims, 9 Drawing Sheets

VERTICAL AXIS WIND TURBINE

FIELD OF THE INVENTION

This invention relates generally to a wind turbine, and more particularly to a vertical axis wind turbine usable for wind energy conversion.

BACKGROUND OF THE INVENTION

Recently, great attention has been drawn to renewable energy sources. Clean natural energy such as wind energy has gained favor as lower cost and more environmentally friendly alternatives to the traditional energy source of fossil fuel, which has disadvantages such as fuel shortage and air pollution.

With this growing interest, considerable efforts have been made to develop wind turbines that are reliable and efficient for receiving and converting wind energy into electric power. Generally, a wind turbine includes a rotor and a plurality of blades engaged with the rotor. The rotor may be coupled with one or more generators. The plurality of blades receives wind energy and transforms it into a rotational torque or force that drives the rotor, which in turn drives the one or more generators to generate electricity.

Depending on the layout of the rotor and blades, wind turbines are classified into horizontal axis wind turbines and vertical axis wind turbines. In a horizontal axis wind turbine, the blades are adapted such that when wind flows towards the blades, a propelling force is generated and causes the blades to rotate around a horizontal axis. The horizontal axis wind turbine usually requires the blades be very long and a very tall mounting tower support them, which may pose disadvantages in cost for transportation, installation and maintenance.

In a vertical axis wind turbine, the blades are adapted such that when wind flows towards the blades, a propelling force is generated and causes the blades to rotate around a vertical axis. A vertical axis wind turbines has little or no need for a tower on which the turbine is mounted. One predominant vertical axis wind turbine is commonly referred to as a Savonius wind turbine. The rotor blades or vanes are traditionally semi-cylindrical shaped and coupled to a central shaft. The principle of operation of Savonius wind turbine machine is based on the difference in the drag forces of semi-circular vanes extending horizontally on a rotor, where one semi-circular vane is oriented so as to be concave while the counterpart vane is oriented to be convex. When placed in an air stream, the drag difference between the concave vane and the convex vane causes the rotor to rotate. Advantages of this type of machine are that it is self-starting, does not require aiming into an incident wind direction, is simple to design, and has low construction cost. However, it has relatively low efficiency.

Therefore, it is desirable to develop a wind turbine that addresses the above mentioned drawbacks.

BRIEF DESCRIPTION OF THE INVENTION

The present invention provides an improved vertical axis wind turbine that addresses the above drawbacks. In one embodiment, the vertical axis wind turbine includes a rotor comprising a vertical oriented shaft, and a plurality of vertical oriented blades angle-equally and radially secured to the vertical aligned shaft. Each of the plurality of vertical oriented blades has a face side, a back side, at least one window and at least one pane pivotally mounted onto the at least one window on the face side such that the at least one pane is rotatable between a closed position and an opening position around a pivotal axis responsive to a wind condition thereof. The pivotal axis is substantially perpendicular to the vertical oriented shaft.

Specifically, when no wind flows towards the face and back sides of one of the plurality of vertical oriented blades, the at least one pane of the one of the plurality of vertical oriented blades is in the closed position, and no force is generated on the one of the plurality of vertical oriented blades. When wind flows towards the back side of the one of the plurality of vertical oriented blades, the at least one pane rotates to the opening position, and no force is generated on the one of the plurality of vertical oriented blades. When wind flows towards the face side of the one of the plurality of vertical oriented blades, the at least one pane of the one of the plurality of vertical oriented blades rotates to in the closed position, and a force is generated on the one of the plurality of vertical oriented blades, which propels the one of the plurality of vertical oriented blades to rotate around the vertical oriented shaft in a rotation direction from the face side to the back side of the one of the plurality of vertical oriented blades, thereby causing the rotor to rotate in the rotation direction. The rotation direction can be clockwise or counter-clockwise.

In one embodiment, the at least one window has an upper frame portion, and the at least one pane has an upper edge portion that is pivotally mounted onto the upper frame portion of the at least one window by one or more hinges. When the at least one pane of one of the plurality of vertical oriented blades is in the closed position, it covers substantially the at least one window of the one of the plurality of vertical oriented blades, and when the at least one pane of the one of the plurality of vertical oriented blades is in the open position, it defines an angle, $\beta$, relative to the one of the plurality of vertical oriented blades, and where $0°<\beta \leqq 90°$. As formed, when the at least one pane of the one of the plurality of vertical oriented blades is in the closes position, no wind is allowed to flow through the at least one window from the face side of the one of the plurality of vertical oriented blades, and wherein when the at least one pane of the one of the plurality of vertical oriented blades is in the opening position, wind is allowed to flow through the at least one window from the face of the one of the plurality of vertical oriented blades.

In one embodiment, each of the plurality of vertical oriented blades is made of a durable material including fiberglass, plastic, wood, steel, aluminum and/or alloy.

Another objective of the present invention is to provide a vertical axis wind turbine, having a rotor comprising a vertical oriented shaft, a mounting support and a plurality of arms angle-equally and radially connecting the vertical oriented shaft and mounting support, and a plurality of vertical oriented blades angle-equally and radially secured to the mounting support. Each of the plurality of vertical oriented blades includes a face side, a back side, at least one window and at least one pane pivotally mounted onto the at least one window on the face side such that the at least one pane is rotatable between a closed position and an opening position around a pivotal axis responsive to a wind condition thereof, the pivotal axis being substantially perpendicular to the vertical oriented shaft. The mounting support includes a circumferential ring or a polygonal frame.

The above and other objects and advantages of this invention will be more fully understood by reference to the following description and the drawings attached hereto.

DETAILED DESCRIPTION OF THE INVENTION

This invention is more particularly described in the following examples that are intended as illustrative only since numerous modifications and variations therein will be apparent to those skilled in the art. Various embodiments of the invention are now described in detail in conjunction with the accompanying drawings 1-9.

Figure 1:
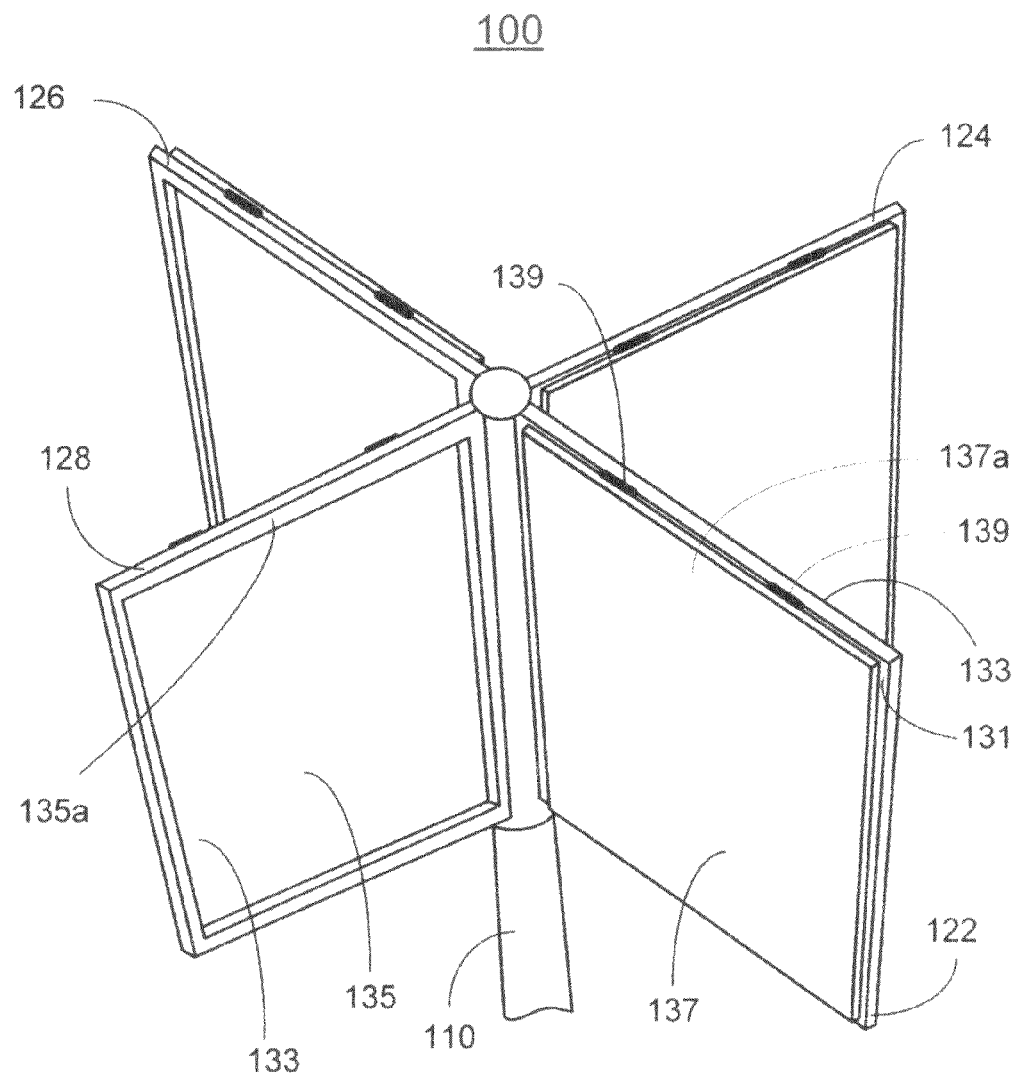
FIG. 1 is a perspective view of a vertical axis wind turbine according to one embodiment of the present invention.

Referring to FIG. 1, a vertical axis wind turbine 100 is shown according to one embodiment of the present invention. The vertical axis wind turbine 100 includes a rotor having a vertical oriented shaft 110. The vertical axis wind turbine 100 includes four vertical oriented blades 122, 124, 126 and 128, which are angle-equally and radially secured to the vertical aligned shaft 110. Each of the vertical oriented blades 122, 124, 126 and 128 has a face side 131, a back side 133, a window 135 and a pane 137. The window 135 has an upper frame portion 135a, and the pane 137 has an upper edge portion 137a. As shown in FIG. 1, the upper edge portion 137a of the pane 137 is pivotally mounted onto the upper frame portion 135a of the window 135 by two hinges 139 on the face side 131. As assembled, the pane 137 is rotatable between a closed position and an opening position (not shown) around a pivotal axis responsive to a wind condition thereof. The pivotal axis is substantially perpendicular to the vertical oriented shaft 110. FIG. 1 is corresponding to an environment condition of which there is no wind flow, and all the pane 137 is in the closed position. Accordingly, the pane 137 covers substantially the window 135. In this embodiment, the pane and window are in a rectangle shape. Other geometric shapes can also be utilized to practice the present invention.

Figure 2:
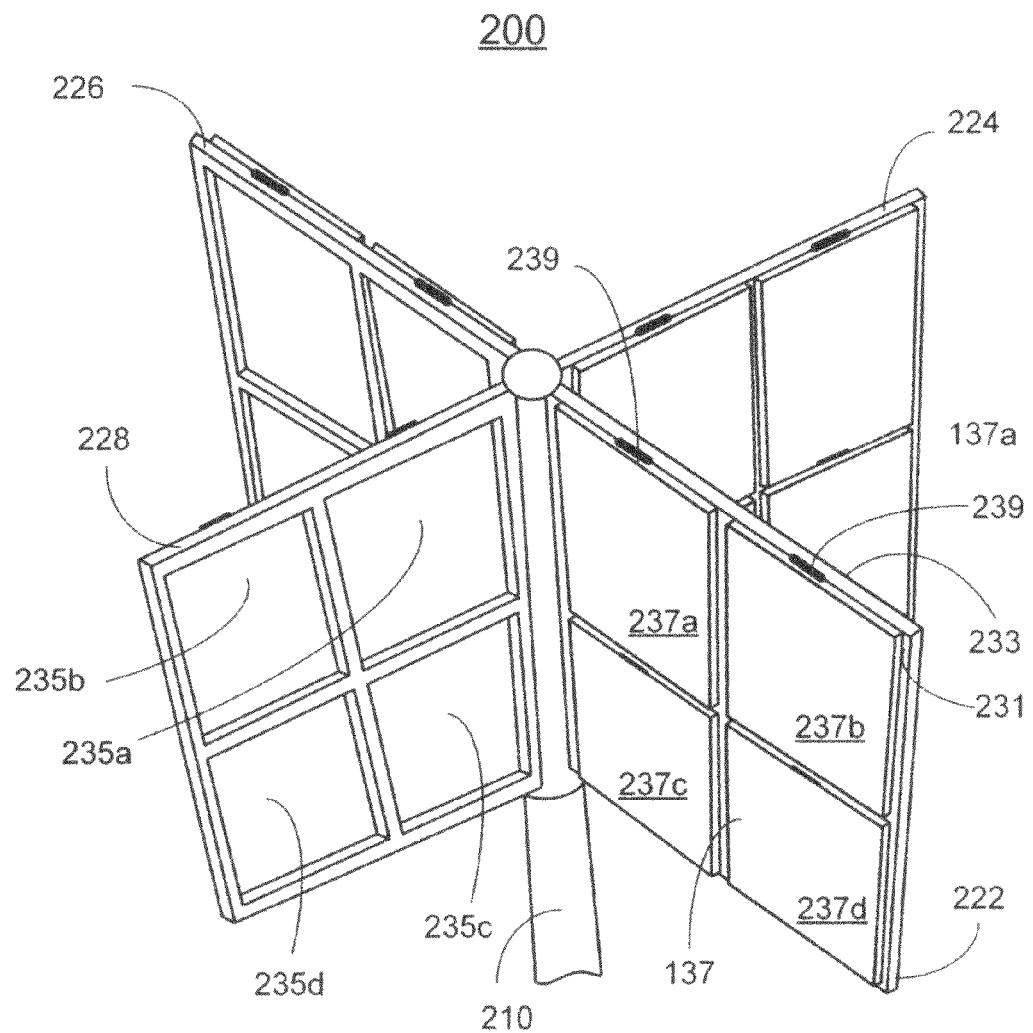
FIG. 2 is a perspective view of a vertical axis wind turbine according to another embodiment of the present invention.
Figure 3:
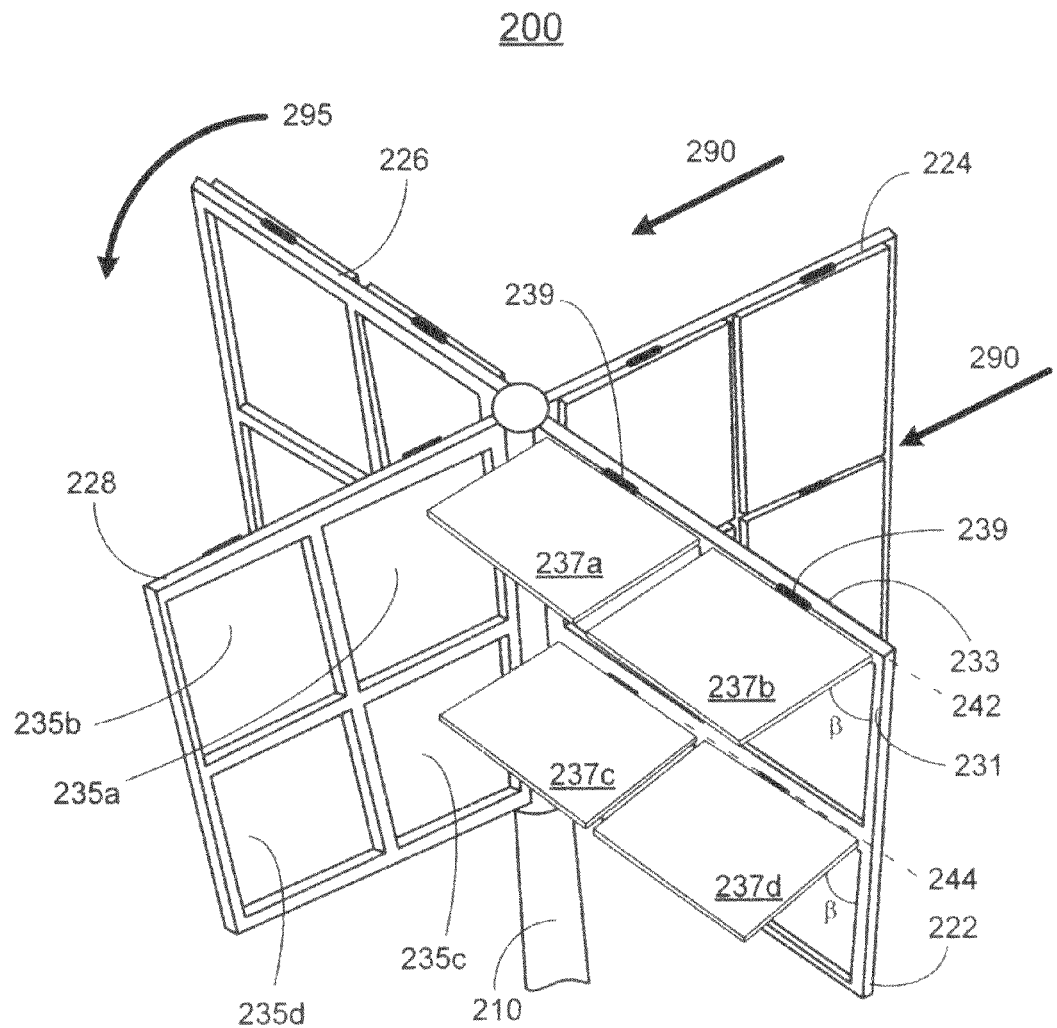
FIG. 3 is a perspective view of the vertical axis wind turbine shown in FIG. 2, in the presence of a wind flow.
Figure 4:
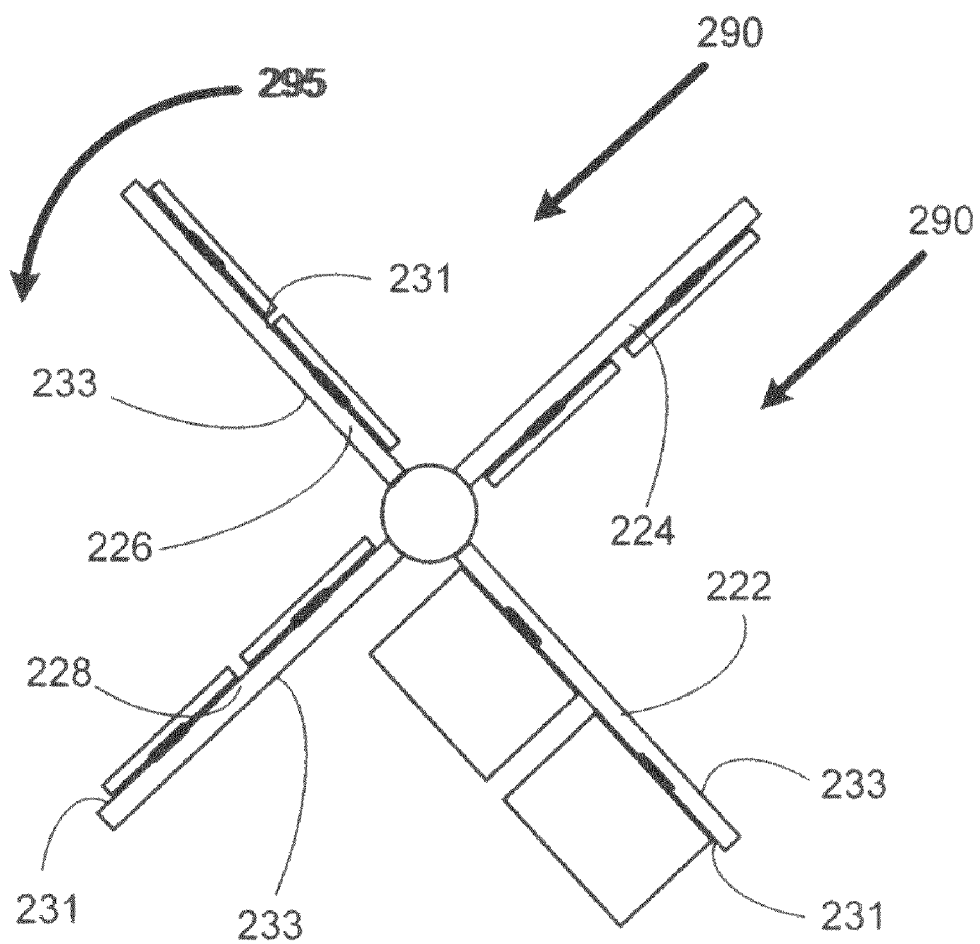
FIG. 4 is a top view of the vertical axis wind turbine shown in FIG. 3.

Referring to FIGS. 2-4, a vertical axis wind turbine 200 is shown according to another embodiment of the present invention. The vertical axis wind turbine 200 includes a rotor having a vertical oriented shaft 210. The vertical axis wind turbine 200 includes four vertical oriented blades 222, 224, 226 and 228, which are angle-equally and radially secured to the vertical aligned shaft 210. Each of the vertical oriented blades 222, 224, 226 and 228 has a face side 231, a back side 233, four windows 235a-235a and four panes 237a-237d. Each pane 237a, 237b, 237c or 237d is pivotally mounted onto a corresponding window 235a, 235b, 235c or 235d by a hinge 239 on the face side 231.

As assembled, each pane 237a, 237b, 237c or 237d is rotatable between a closed position and an opening position around a pivotal axis responsive to a wind condition thereof. The pivotal axis is substantially perpendicular to the vertical oriented shaft 210. The wind condition includes whether there is a wind flow towards the face side and/or the back side of a blade.

Specifically, as shown in FIG. 2, if no wind flows in the environment of the wind turbine 200, all panes are in their closed positions due to the gravity, that is, each pane substantially covers a corresponding window, and no force is generated on these four blades 222, 224, 226 and 228. Accordingly the wind turbine 200 is still. As shown in FIGS. 3 and 4, wind flows along a direction 290 that is parallel to the blade 224 and 226. In other words, no wind flows towards the face side 231 and the back side 233 of the blades 224 and 226. Therefore, all panes of the blades 224 and 226 are in their closed positions due to the gravity. In the cases, no force is generated on the blades 224 and 226.

However, the wind flows towards the back side 233 of the blade 222, and pushes each pane 237a, 237b, 237c or 237d of the blade 222 rotates from the closed position to the opening position along the pivotal axes 242 and 244, respectively, which are substantially perpendicular to the vertical oriented shaft 110. Consequently, the wind flows through the windows 235a, 235b, 235c and 235d and no force is generated on the blade 222. In the opening position, each pane 237a, 237b, 237c or 237d of the blade 222 defines an angle, β, relative to the blade 222, and where 0°<β≦90°, as shown in FIG. 3.

For the blade 226, the wind flows towards the face side 231 of the blade 226, and pushes each pane 237a, 237b, 237c or 237d of the blade 226 rotating to its closed position. In the case, the wind is blocked by each pane 237a, 237b, 237c or 237d of the blade 226, thereby generating a force on the blade 226, which propels the blade 226 to rotate around the vertical oriented shaft 110 in a rotation direction 295 from the face side 231 to the back side 233 of the blades 226. Accordingly, the vertical oriented shaft 110, thus the rotor, rotates in the rotation direction 295.

When the wind flows continuously, the propelling force is generated on the blades 222-226 alternatively, and pushes the corresponding blades, thus the rotor to rotate continuously.

In this exemplary embodiment shown in FIGS. 3 and 4, the rotation direction 295 is counter-clockwise. The rotation direction can be also clockwise if all panes are assembled on the other side (e.g., back side) of the blades.

According to the present invention, the rotor rotates when wind blows from any direction, whereby the kinetic energy in wind is converted into mechanical energy, which can be converted in electricity, by driving one or more generators with the rotor.

Figure 5:
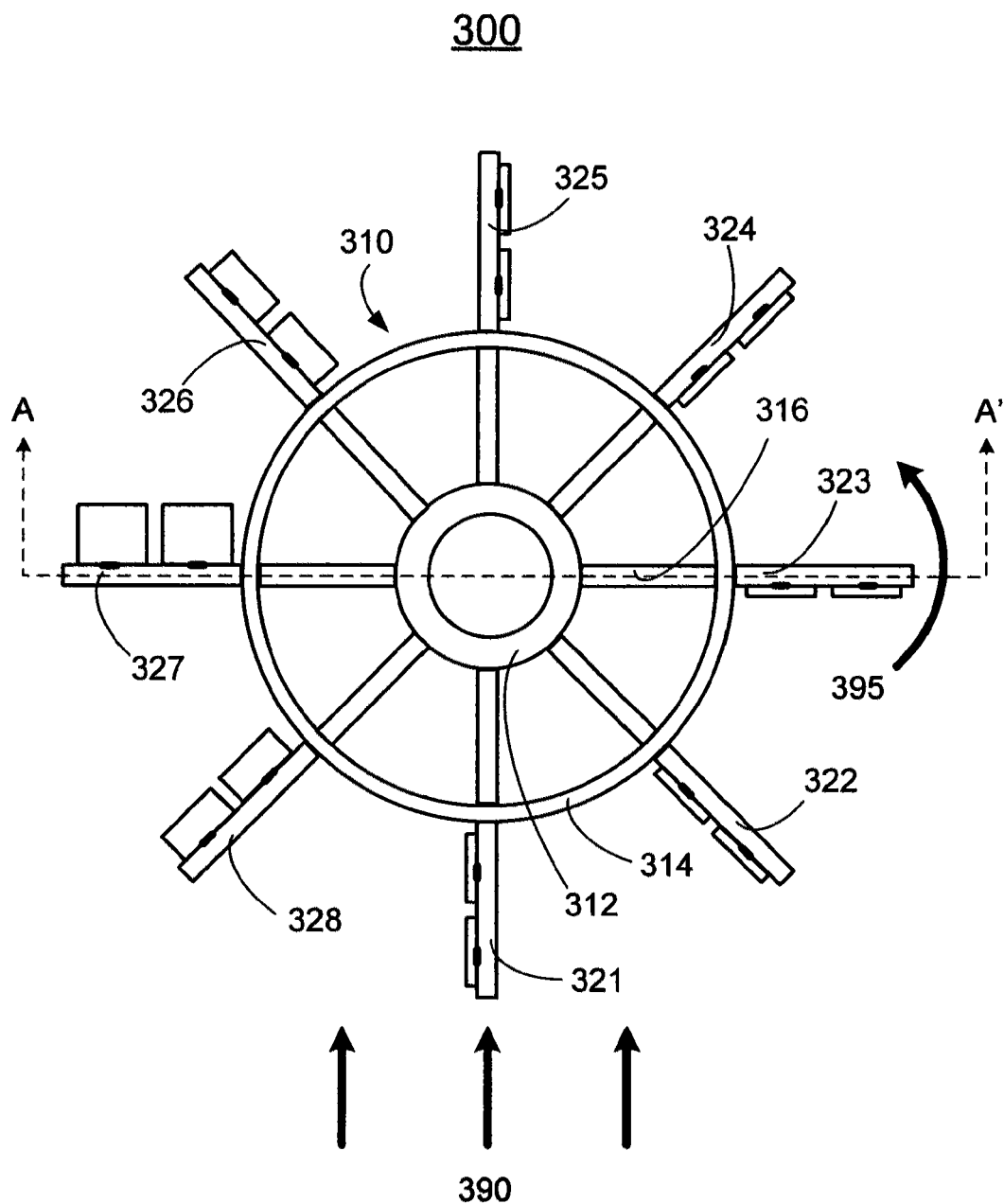
FIG. 5 is a top view of a vertical axis wind turbine according to one embodiment of the present invention.
Figure 6:
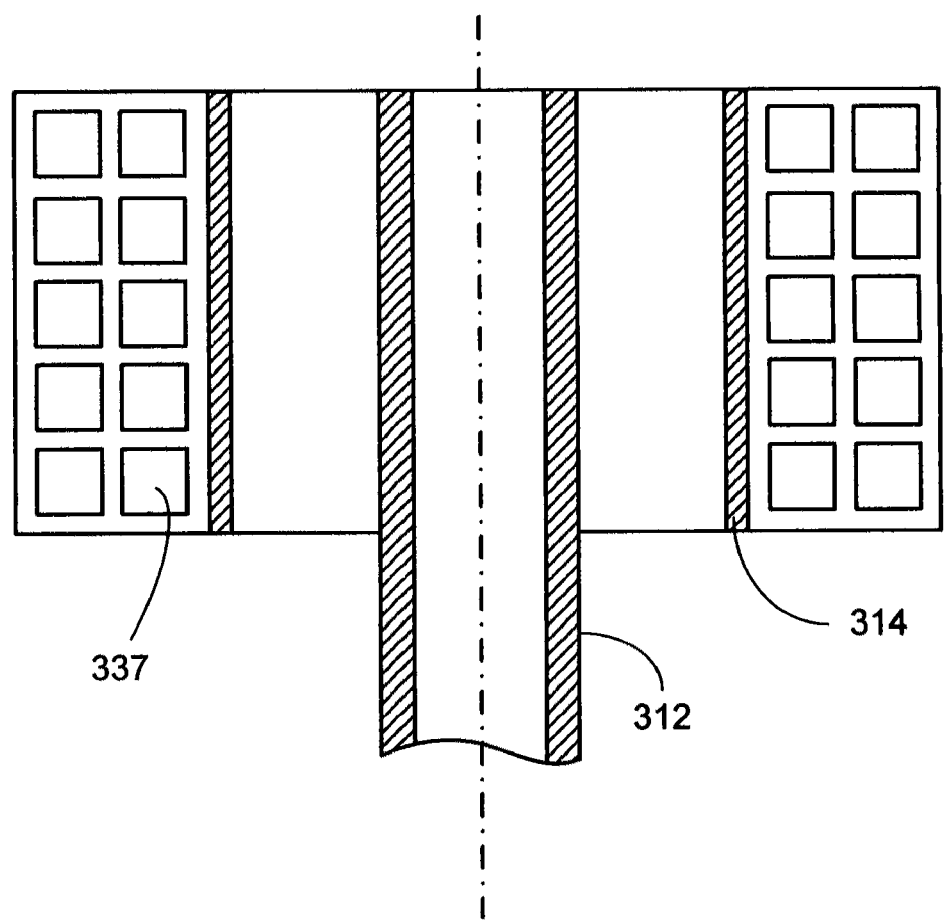
FIG. 6 is a cross-sectional view of the vertical axis wind turbine along with A-A' line shown in FIG. 5.
Figure 7:
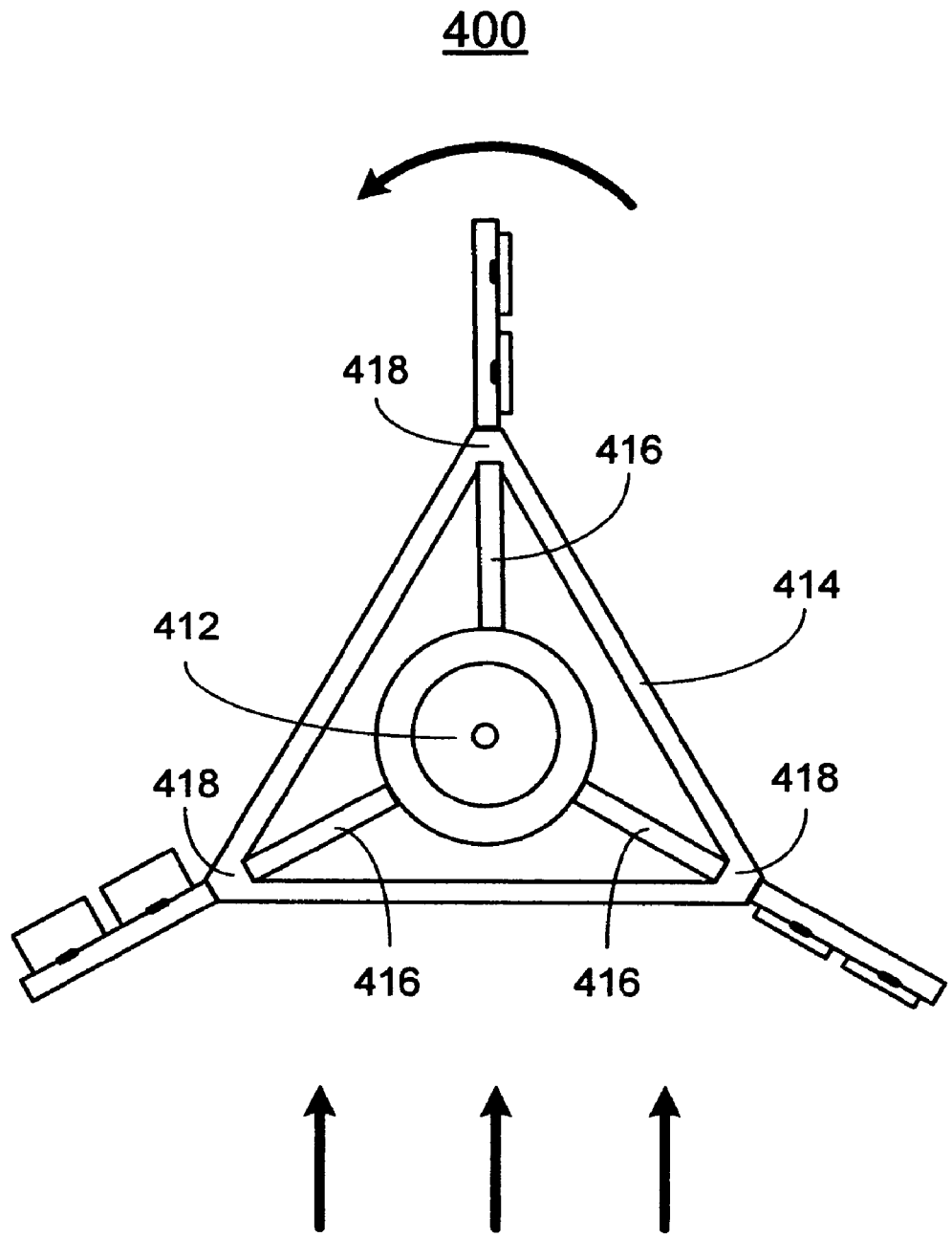
FIG. 7 is a top view of a vertical axis wind turbine according to another embodiment of the present invention.

FIGS. 5 and 6 show a vertical axis wind turbine 300 according to one embodiment of the present invention. The wind turbine 300 includes a rotor 310 having a vertical oriented shaft 312, a mounting support 314 and a plurality of arms 316 angle-equally and radially connecting the vertical oriented shaft 312 and the mounting support 314. The mounting support 314 includes a circular ring structure in this embodiment. The mounting support can also be a polygonal frame. For example, as shown in FIG. 7, the vertical axis wind turbine 400 adopts a triangle frame 414 as the mounting support. The triangle (polygonal) frame 414 has three corners 418. Each corner 418 is connected to the vertical oriented shaft 412 by a respective arm 416.

In this exemplary embodiment shown in FIGS. 5 and 6, the wind turbine 300 has eight blades 321-328, which are angle-equally and radially mounted to the circumference of the mounting support 314. Each blade has a plurality of windows and a plurality of panes, where each pane is pivotally mounted onto a corresponding window, so that it rotatable between a closed position and an opening position in response to a wind condition therein. As shown in FIGS. 5 and 6, for a wind flow in the direction 390, panes in the blades 326, 327 and 328 are in their opening positions. Accordingly, no propelling forces are generated on the blades 326, 327 and 328 at this moment. Although panes in the blades 321 and 325 are in their closed positions, no propelling forces are generated on the blades 321 and 325 either, because the wind flow is parallel to the blades 321 and 325. At this moment, propelling forces are generated only on the blades 322, 323 and 324, where the wind flows towards the face sides of the blades 322, 323 and 324. The generated propelling forces cause the rotor 310 to rotate along the direction 395. When the wind flows continuously, the propelling forces are generated on the blades 321-328 alternatively, and push the corresponding blades, thus the rotor, to rotate continuously, which converts wind energy into mechanical energy.

Figure 8:
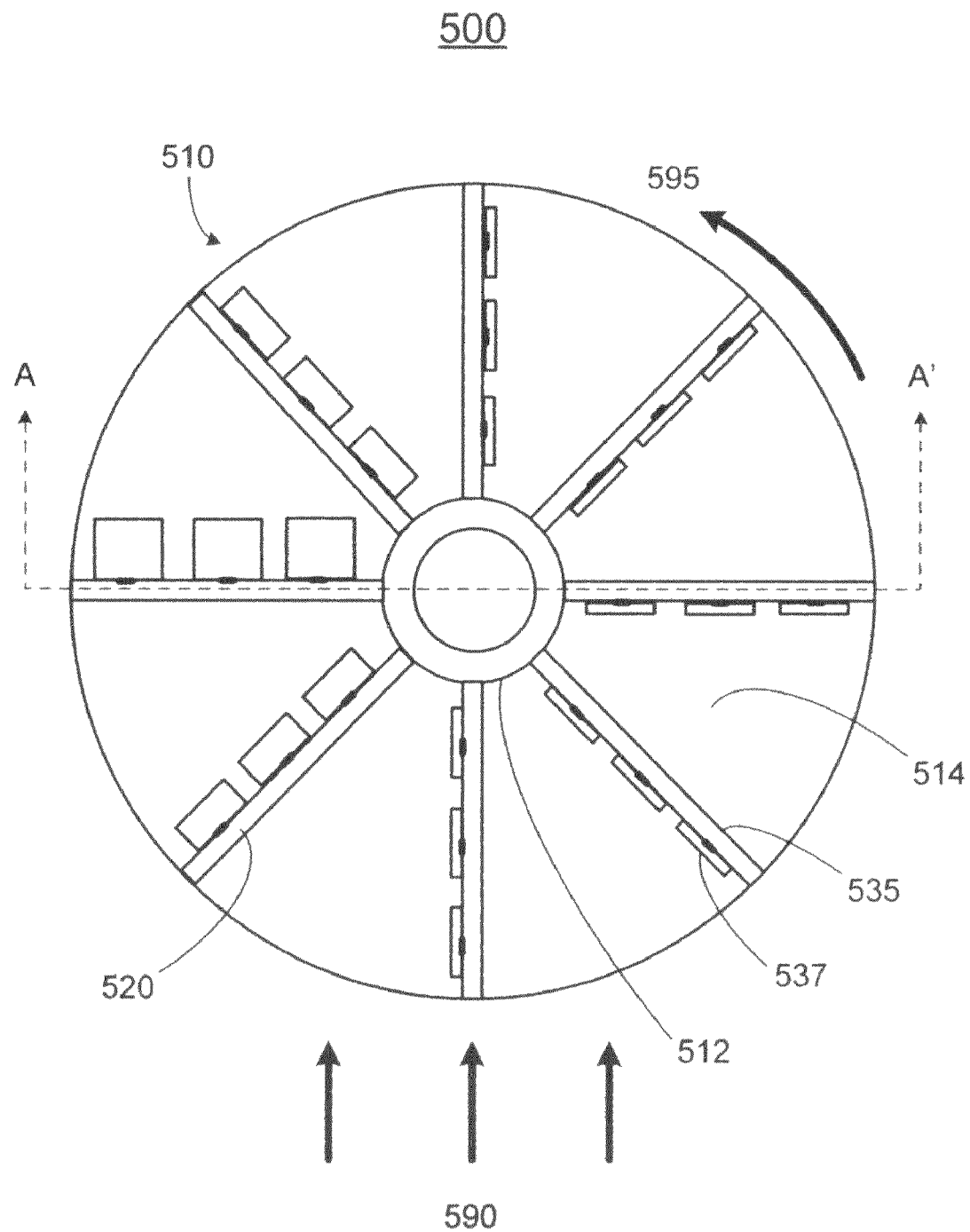
FIG. 8 is a top view of a vertical axis wind turbine according to one embodiment of the present invention.
Figure 9:
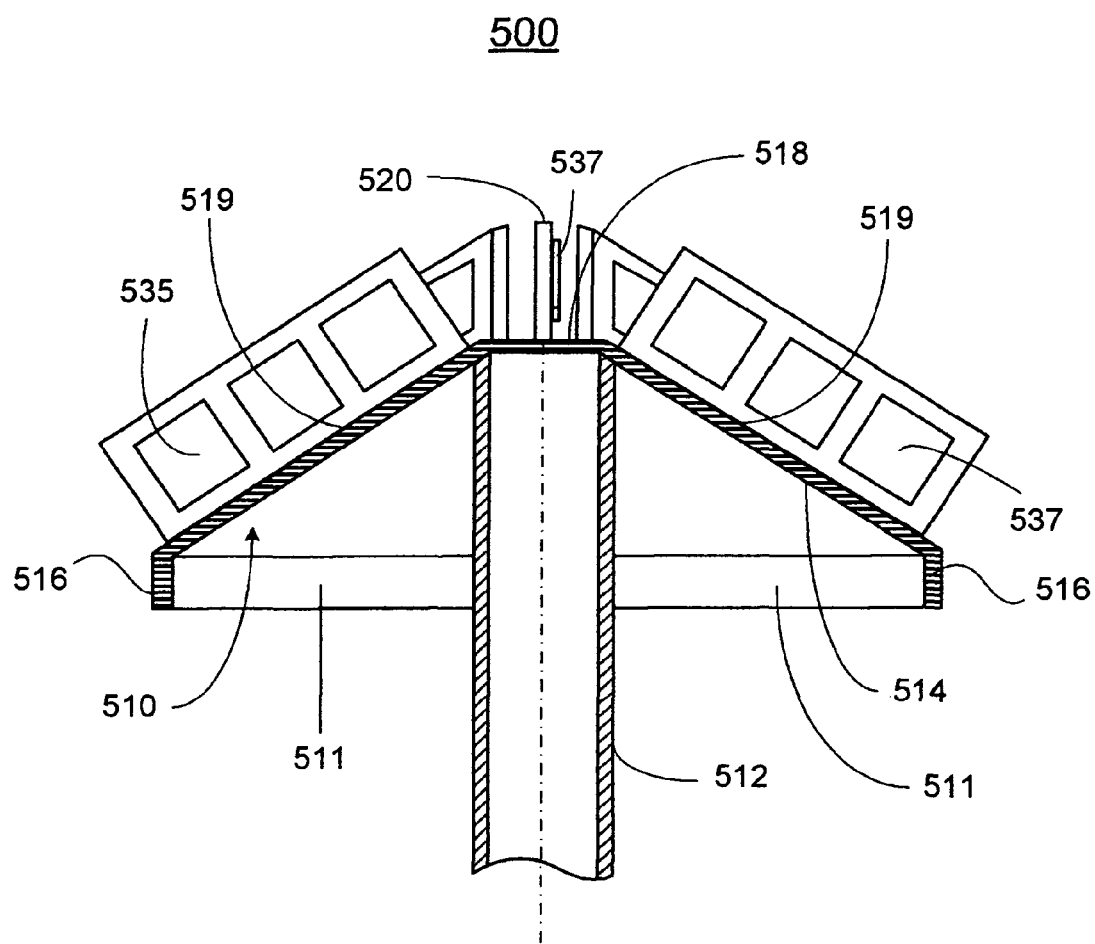
FIG. 9 is a cross-sectional view of the vertical axis wind turbine along with A-A' line shown in FIG. 8.

FIGS. 8 and 9 show a vertical axis wind turbine 500 according to another embodiment of the present invention, where the rotor 510 has a vertical oriented shaft 512 and a cone-shape mounting support (roof) 514 engaged with the vertical oriented shaft 512. As shown in FIG. 9, the cone-shape mounting support 514 has an umbrella base 511 having a flat bottom section that goes radially around the vertical oriented shaft 512 and a cone-shape, roof-type top part 519. The cone-shape, roof-type top part 519 has an apex 518 secured to the top end of the vertical oriented shaft 512 and a bottom 516 secured to the umbrella base 511. As shown in FIG. 9, the rotor 510 is an umbrella-type rotor 510. The eight blades 520 are vertically mounted onto the cone-shape roof-type top part 519 of the mounting support 514. Each blade 520 includes a number of windows 535 and a number of panes 537 pivotally secured to the upper frame portions of the corresponding windows 535. Similar to the embodiment shown in FIGS. 5 and 6, when wind flows in any direction, for example, in the direction 590, the umbrella-type rotor 510 rotates in the rotation direction 595, a counter-clockwise direction. Therefore, the kinetic energy in wind is converted into mechanical energy of the umbrella-type rotor 510.

The present invention, among other unique features, discloses simple but efficient vertical axis wind turbines, which requires no special process of manufacturing. Each part of the wind turbines can be made of a durable material including fiberglass, plastic, wood, steel, aluminum, alloy, and the like. The assembly of the wind turbines is a straightforward process, which involves mounting different parts together in accordance with embodiments of the present invention, by any available mounting means, such as screw mounting means, glue mounting means, welding mounting means and the like. No supporting tower is necessary for the installation.

The present application can find widespread applications. For example, the invented wind turbine can be used to generate electricity in power plants. The wind turbine can be placed in the backyard, fence wall and/or roof top to convert the wind energy into mechanical energy and/or electrical energy for the household uses. It can also be installed in ships, sailing boats, and other vehicles for generating powers as their driving powers.

As will be apparent to those skilled in the art to which the invention pertains, the present invention may be embodied in forms other than those specifically disclosed above without departing from the spirit or essential characteristics of the invention. The particular embodiments of the invention described above are, therefore, to be considered as illustrative and not restrictive. The scope of the invention is as set forth in the appended claims rather than being limited to the examples contained in the foregoing description.

What is claimed is:

1. A vertical axis wind turbine, comprising:
   an umbrella-type rotor comprising a vertical oriented shaft, and a mounting support, wherein the mounting support comprises an umbrella base having a flat bottom section that goes radially around the vertical oriented shaft, and a cone-shape, roof-type top part having an apex secured to a top end of the vertical oriented shaft and a bottom secured to the umbrella base; and
   a plurality of vertical oriented blades angle-equally and radially secured to the cone-shape, roof-type top part of the mounting, each of the plurality of vertical oriented blades having a face side, a back side, at least one window and at least one pane pivotally mounted onto the at least one window on the face side such that the at least one pane is rotatable between a closed position and an opening position around a pivotal axis responsive to a wind condition thereof, the pivotal axis being substantially perpendicular to the vertical oriented shaft,
   wherein when no wind flows towards the face and back sides of one of the plurality of vertical oriented blades, the at least one pane of the one of the plurality of vertical oriented blades is in the closed position, and no force is generated on the one of the plurality of vertical oriented blades;
   wherein when wind flows towards the back side of the one of the plurality of vertical oriented blades, the at least one pane rotates to the opening position, and no force is generated on the one of the plurality of vertical oriented blades; and
   wherein when wind flows towards the face side of the one of the plurality of vertical oriented blades, the at least one pane of the one of the plurality of vertical oriented blades rotates to in the closed position, and a force is generated on the one of the plurality of vertical oriented blades, which propels the one of the plurality of vertical oriented blades to rotate around the vertical oriented shaft in a rotation direction from the face side to the back side of the one of the plurality of vertical oriented blades, thereby causing the rotor to rotate in the rotation direction.

2. The vertical axis wind turbine of claim 1, wherein the at least one window has an upper frame portion, and wherein the at least one pane has an upper edge portion that is pivotally mounted onto the upper frame portion of the at least one window by one or more hinges.

3. The vertical axis wind turbine of claim 1, wherein when the at least one pane of one of the plurality of vertical oriented blades is in the closed position, it covers substantially the at least one window of the one of the plurality of vertical oriented blades.

4. The vertical axis wind turbine of claim 3, wherein when the at least one pane of the one of the plurality of vertical oriented blades is in the open position, it defines an angle, $\beta$, relative to the one of the plurality of vertical oriented blades, and wherein $0° < \beta < 90°$.

5. The vertical axis wind turbine of claim 4, wherein when the at least one pane of the one of the plurality of vertical oriented blades is in the closes position, no wind is allowed to flow through the at least one window from the face side of the one of the plurality of vertical oriented blades, and wherein when the at least one pane of the one of the plurality of vertical oriented blades is in the opening position, wind is allowed to flow through the at least one window from the face of the one of the plurality of vertical oriented blades.

6. The vertical axis wind turbine of claim 1, wherein the rotation direction is clockwise or counter-clockwise.

7. The vertical axis wind turbine of claim 1, wherein each of the plurality of vertical oriented blades is made of a durable material including fiberglass, plastic, wood, steel, aluminum and/or alloy.

* * * * *